US012696088B2

(12) United States Patent
Rochford et al.

(10) Patent No.: US 12,696,088 B2
(45) Date of Patent: Jul. 28, 2026

(54) TRANSPARENT, ON-DEMAND ROUTE DETERMINATION AND DELEGATED AUTHORIZATION IN A LARGE-SCALE, DECENTRALIZED SERVICE MESH

(71) Applicant: Dell Products L.P., Round Rock, TX (US)

(72) Inventors: Brian Rochford, Ovens (IE); Andrea Roggerone, Dublin (IE)

(73) Assignee: Dell Products L.P., Round Rock, TX (US)

( * ) Notice: Subject to any disclaimer, the term of this patent is extended or adjusted under 35 U.S.C. 154(b) by 20 days.

(21) Appl. No.: 18/981,405

(22) Filed: Dec. 13, 2024

(65) Prior Publication Data

US 2026/0172823 A1 Jun. 18, 2026

(51) Int. Cl.
*H04W 12/06* (2021.01)
*H04W 12/42* (2021.01)

(52) U.S. Cl.
CPC ........... *H04W 12/06* (2013.01); *H04W 12/42* (2021.01)

(58) Field of Classification Search
CPC .............................. H04W 12/06; H04W 12/42
See application file for complete search history.

(56) References Cited

U.S. PATENT DOCUMENTS

| | | | |
|---|---|---|---|
| 8,387,046 B1 | 2/2013 | Montague | |
| 11,106,800 B1 | 8/2021 | Markowsky | |

| | | | |
|---|---|---|---|
| 11,108,828 B1 * | 8/2021 | Curtis ................... | H04L 63/104 |
| 11,469,956 B2 | 10/2022 | Venkatramani | |
| 11,709,720 B1 | 7/2023 | Fournier | |
| 12,170,696 B2 | 12/2024 | Curtis et al. | |
| 12,189,780 B1 | 1/2025 | Markowsky | |
| 12,353,551 B1 | 7/2025 | Lindsey | |
| 12,563,038 B2 | 2/2026 | White | |
| 12,591,668 B1 | 3/2026 | Lindsey | |
| 2009/0216875 A1 * | 8/2009 | Shi ...................... | H04L 63/0236 |
| | | | 709/224 |

(Continued)

OTHER PUBLICATIONS

Office Action mailed Oct. 28, 2025 for U.S. Appl. No. 18/672,996, 50 pages.

(Continued)

*Primary Examiner* — Blake I Narramore
(74) *Attorney, Agent, or Firm* — Amin, Turocy & Watson, LLP

(57) ABSTRACT

A system can intercept, by a kernel-space application of a node of nodes, a call from a microservice that is directed to a remote endpoint that is external to a decentralized service mesh architecture, wherein the kernel-space application operates in a kernel space of the node, and wherein the microservice executes in a user space of the node. The system can perform, by the kernel-space application, an authorization check on the call based on the microservice and a virtual address of the remote endpoint identified in the call, to produce an authorization result determine, by the kernel-space application, connectivity information of the remote endpoint based on the virtual address of the remote endpoint identified in the call. The system can relay, by the kernel-space application, network traffic between the microservice and the remote endpoint, based on the authorization result indicating that the call is authorized and using the connectivity information.

20 Claims, 10 Drawing Sheets

(56)                    References Cited

U.S. PATENT DOCUMENTS

| | | | |
|---|---|---|---|
| 2013/0031356 A1 | 1/2013 | Prince et al. | |
| 2015/0120583 A1 | 4/2015 | Zarrella | |
| 2016/0315919 A1* | 10/2016 | Martini | H04L 69/326 |
| 2017/0039211 A1 | 2/2017 | Pottinger | |
| 2017/0234709 A1 | 8/2017 | Mackie | |
| 2019/0303541 A1 | 10/2019 | Reddy et al. | |
| 2020/0286011 A1 | 9/2020 | Meng | |
| 2021/0058424 A1 | 2/2021 | Chang | |
| 2021/0374242 A1 | 12/2021 | Dabak | |
| 2021/0392477 A1* | 12/2021 | Taft | H04W 24/02 |
| 2022/0124547 A1* | 4/2022 | Young | H04W 28/0247 |
| 2023/0236909 A1* | 7/2023 | Zhang | G06F 9/5027 |
| | | | 718/100 |
| 2024/0086558 A1 | 3/2024 | Jadhav | |
| 2025/0175475 A1 | 5/2025 | Markowsky | |

OTHER PUBLICATIONS

Notice of Allowance mailed Oct. 16, 2025 for U.S. Appl. No. 18/516,628, 44 pages.

Office Action mailed Jun. 18, 2025 for U.S. Appl. No. 18/516,628, 25 pages.

"Linux Intrusion Detection System" Wikipedia. [https://en.wikipedia.org/wiki/Linux_Intrusion_Detection_System] retrieved Sep. 18, 2025, 2 pages.

Harrenstien et al. "Dod Internet Host Table Specification" RFC 952, [https://datatracker.ietf.org/doc/html/rfc952] Oct. 1985, 6 pages.

P. Mockapetris. "Domain Names—Concepts and Facilities" RFC 1034, [https://datatracker.ietf.org/doc/html/rfc1034] Nov. 1987, 55 pages.

"DNS Proxying" Istio. [https://istio.io/latest/docs/ops/configuration/traffic-management/dns-proxy/] retrieved Apr. 11, 2025, 9 pages.

"Auto allocate ips based on hashing #42624" istio/istio. [https://github.com/istio/istio/pull/42624/files] retrieved Apr. 11, 2025, 9 pages.

White et al. "Transparent, On-Demand Route Determination and Delegated Authorization in a Large-Scale, Decentralized Service Mesh" U.S. Appl. No. 18/516,628, filed Nov. 21, 2023, 52 pages.

White et al. "Initiating Transmission Control Protocol Connections to Non-Routable Remote Endpoints Within a Decentralized Service Mesh" U.S. Appl. No. 18/672,996, filed May 23, 2024, 43 pages.

Rochford, et al. "Protection from Unwanted Behavior in Remote Appliances in a Decentralized Service Mesh" U.S. Appl. No. 19/023,245, filed Jan. 15, 2025, 43 pages.

Office Action mailed Feb. 24, 2026 for U.S. Appl. No. 18/672,996, 34 pages.

Office Action mailed May 12, 2026 for U.S. Appl. No. 19/023,245, 70 pages.

* cited by examiner

100

| SERVER 102 |
|---|

SERVICE MESH 112

CONTAINERIZED APPS. 114

CONTAINERIZED APP. 116

MICROSERVICE 118 (USER SPACE)

ON-DEMAND ROUTE DETERMINATION AND DELEGATED AUTHORIZATION IN A DECENTRALIZED SERVICE MESH COMPONENT 108 (KERNEL SPACE)

REMOTE CONNECTIVITY A 124A

REMOTE CONNECTIVITY B 124B

COMMUNICATIONS NETWORK 104

REMOTE ENDPOINT 110

REMOTE COMPUTER 106

200

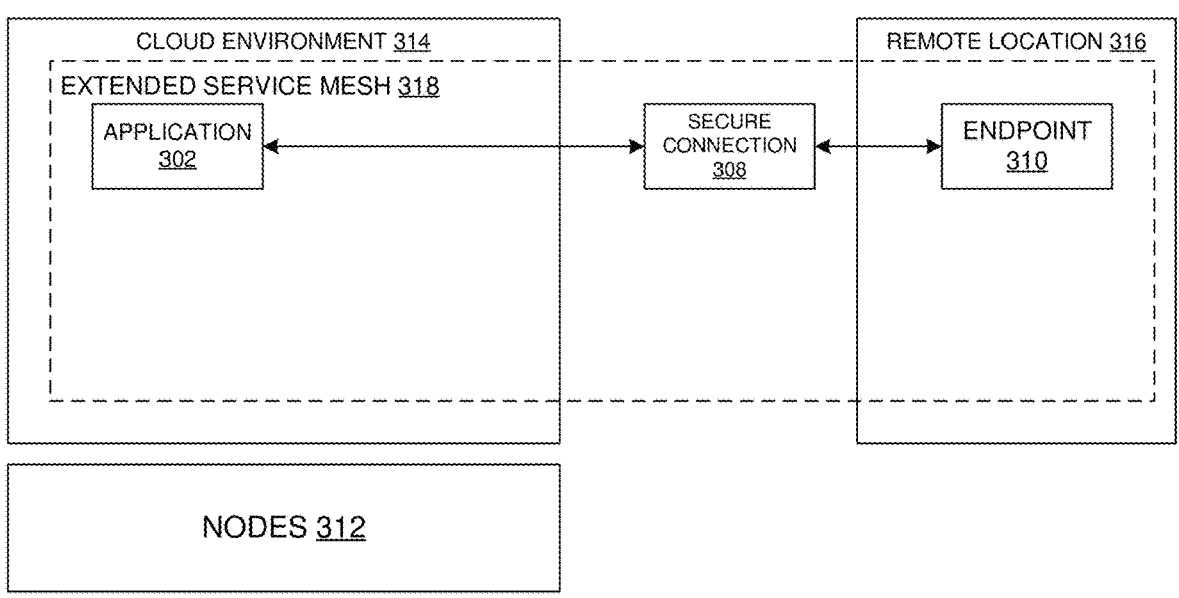
FIG. 3

400
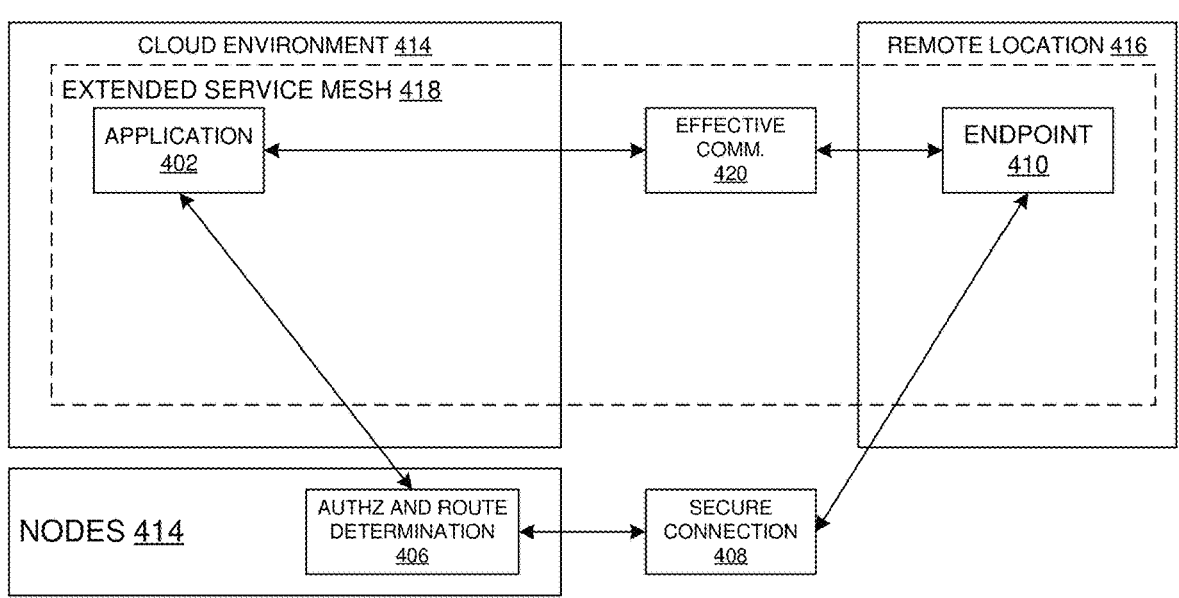
FIG. 4

500
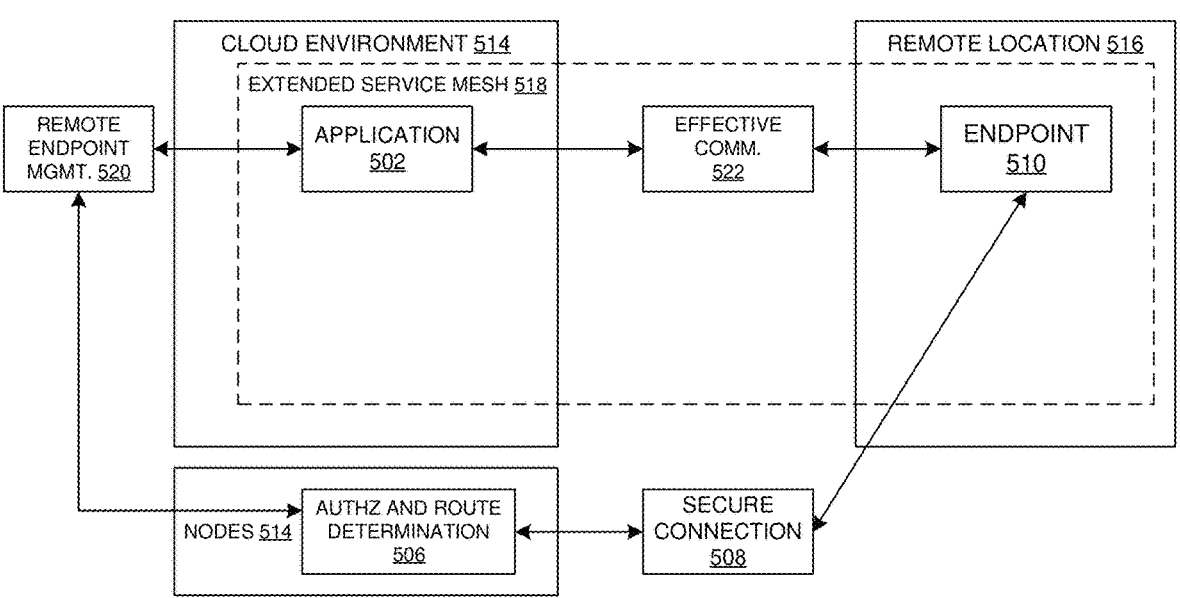
FIG. 5

600
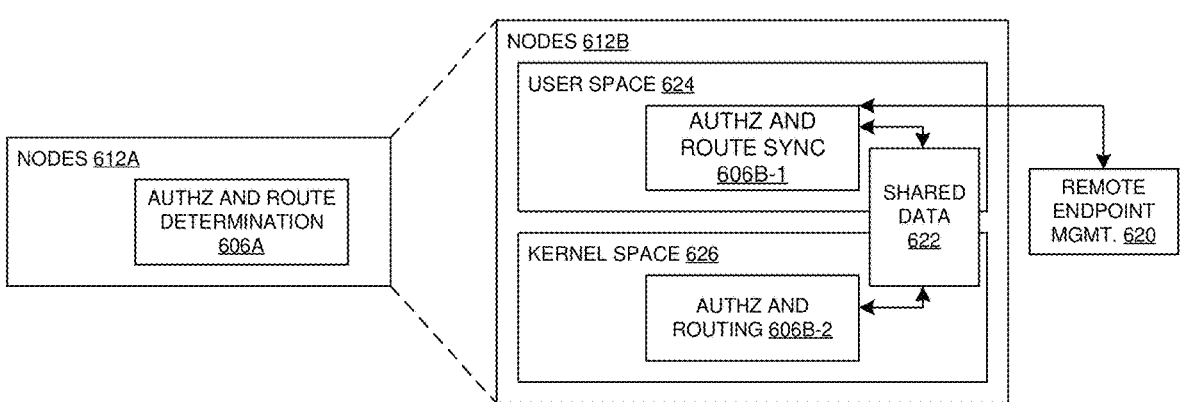
NODES 612A
AUTHZ AND ROUTE
DETERMINATION
606A
NODES 612B
USER SPACE 624
AUTHZ AND
ROUTE SYNC
606B-1
KERNEL SPACE 626
AUTHZ AND
ROUTING 606B-2
SHARED
DATA
622
REMOTE
ENDPOINT
MGMT. 620
FIG. 6

700

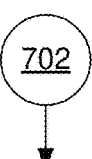

702

EXECUTING A CONTAINERIZED APPLICATION THAT COMPRISES A MICROSERVICE OF A GROUP OF MICROSERVICES MAINTAINED BY A DECENTRALIZED SERVICE MESH ARCHITECTURE, WHEREIN THE GROUP OF MICROSERVICES EXECUTES ON NODES 704

INTERCEPTING, BY A KERNEL-SPACE APPLICATION OF A NODE OF THE NODES, A CALL FROM THE MICROSERVICE THAT IS DIRECTED TO A REMOTE ENDPOINT THAT IS EXTERNAL TO THE DECENTRALIZED SERVICE MESH ARCHITECTURE, WHEREIN THE KERNEL-SPACE APPLICATION OPERATES IN A KERNEL SPACE OF THE NODE, AND WHEREIN THE MICROSERVICE EXECUTES IN A USER SPACE OF THE NODE 706

PERFORMING, BY THE KERNEL-SPACE APPLICATION, AN AUTHORIZATION CHECK ON THE CALL BASED ON AN IDENTIFICATION OF THE MICROSERVICE AND A VIRTUAL ADDRESS OF THE REMOTE ENDPOINT IDENTIFIED IN THE CALL, TO PRODUCE AN AUTHORIZATION RESULT 708

DETERMINING, BY THE KERNEL-SPACE APPLICATION, CONNECTIVITY INFORMATION OF THE REMOTE ENDPOINT BASED ON THE VIRTUAL ADDRESS OF THE REMOTE ENDPOINT IDENTIFIED IN THE CALL 710

RELAYING, BY THE KERNEL-SPACE APPLICATION, NETWORK TRAFFIC BETWEEN THE MICROSERVICE AND THE REMOTE ENDPOINT, BASED ON THE AUTHORIZATION RESULT INDICATING THAT THE CALL IS AUTHORIZED AND USING THE CONNECTIVITY INFORMATION 712

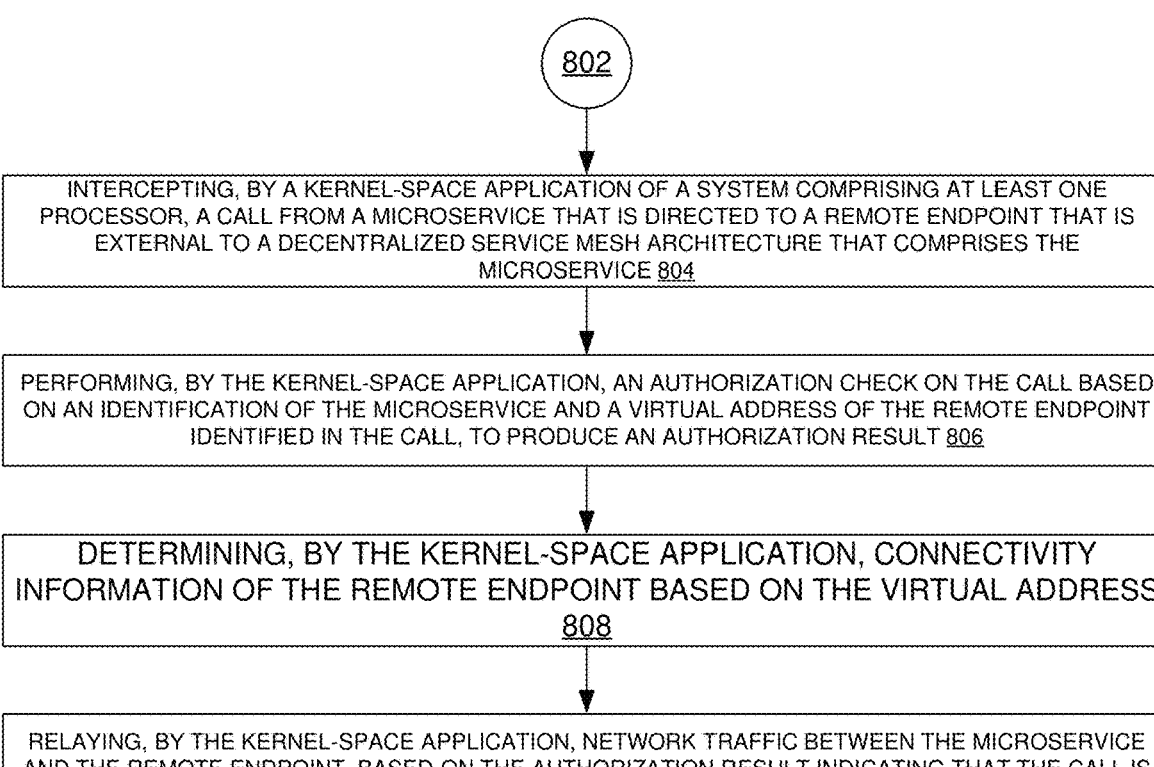

802

INTERCEPTING, BY A KERNEL-SPACE APPLICATION OF A SYSTEM COMPRISING AT LEAST ONE PROCESSOR, A CALL FROM A MICROSERVICE THAT IS DIRECTED TO A REMOTE ENDPOINT THAT IS EXTERNAL TO A DECENTRALIZED SERVICE MESH ARCHITECTURE THAT COMPRISES THE MICROSERVICE 804

PERFORMING, BY THE KERNEL-SPACE APPLICATION, AN AUTHORIZATION CHECK ON THE CALL BASED ON AN IDENTIFICATION OF THE MICROSERVICE AND A VIRTUAL ADDRESS OF THE REMOTE ENDPOINT IDENTIFIED IN THE CALL, TO PRODUCE AN AUTHORIZATION RESULT 806

DETERMINING, BY THE KERNEL-SPACE APPLICATION, CONNECTIVITY INFORMATION OF THE REMOTE ENDPOINT BASED ON THE VIRTUAL ADDRESS 808

RELAYING, BY THE KERNEL-SPACE APPLICATION, NETWORK TRAFFIC BETWEEN THE MICROSERVICE AND THE REMOTE ENDPOINT, BASED ON THE AUTHORIZATION RESULT INDICATING THAT THE CALL IS AUTHORIZED AND USING THE CONNECTIVITY INFORMATION 810

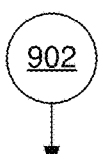

902

INTERCEPTING, BY A KERNEL-SPACE APPLICATION, A CALL FROM A USER-SPACE APPLICATION THAT IS DIRECTED TO A REMOTE ENDPOINT 904

AUTHORIZING, BY THE KERNEL-SPACE APPLICATION, THE CALL BASED ON AN IDENTIFICATION OF THE USER-SPACE APPLICATION AND A VIRTUAL ADDRESS OF THE REMOTE ENDPOINT IDENTIFIED IN THE CALL, TO PRODUCE AN AUTHORIZATION RESULT 906

DETERMINING, BY THE KERNEL-SPACE APPLICATION, CONNECTIVITY INFORMATION OF THE REMOTE ENDPOINT BASED ON THE VIRTUAL ADDRESS 908

RELAYING, BY THE KERNEL-SPACE APPLICATION, NETWORK TRAFFIC BETWEEN THE USER-SPACE APPLICATION AND THE REMOTE ENDPOINT, BASED ON THE AUTHORIZING OF THE CALL AND USING THE CONNECTIVITY INFORMATION 910

TRANSPARENT, ON-DEMAND ROUTE DETERMINATION AND DELEGATED AUTHORIZATION IN A LARGE-SCALE, DECENTRALIZED SERVICE MESH

BACKGROUND

A group of microservices can execute within a service mesh to collectively provide a computer service.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can execute a containerized application that comprises a microservice of a group of microservices maintained by a decentralized service mesh architecture, wherein the group of microservices executes on nodes. The system can intercept, by a kernel-space application of a node of the nodes, a call from the microservice that is directed to a remote endpoint that is external to the decentralized service mesh architecture, wherein the kernel-space application operates in a kernel space of the node, and wherein the microservice executes in a user space of the node. The system can perform, by the kernel-space application, an authorization check on the call based on an identification of the microservice and a virtual address of the remote endpoint identified in the call, to produce an authorization result determine, by the kernel-space application, connectivity information of the remote endpoint based on the virtual address of the remote endpoint identified in the call. The system can relay, by the kernel-space application, network traffic between the microservice and the remote endpoint, based on the authorization result indicating that the call is authorized and using the connectivity information.

An example method can comprise intercepting, by a kernel-space application of a system comprising at least one processor, a call from a microservice that is directed to a remote endpoint that is external to a decentralized service mesh architecture that comprises the microservice. The method can further comprise performing, by the kernel-space application, an authorization check on the call based on an identification of the microservice and a virtual address of the remote endpoint identified in the call, to produce an authorization result. The method can further comprise determining, by the kernel-space application, connectivity information of the remote endpoint based on the virtual address. The method can further comprise relaying, by the kernel-space application, network traffic between the microservice and the remote endpoint, based on the authorization result indicating that the call is authorized and using the connectivity information.

An example non-transitory computer-readable medium can comprise instructions that, in response to execution, cause a system comprising a processor to perform operations. These operations can comprise intercepting, by a kernel-space application, a call from a user-space application that is directed to a remote endpoint. These operations can further comprise authorizing, by the kernel-space application, the call based on an identification of the user-space application and a virtual address of the remote endpoint identified in the call, to produce an authorization result. These operations can further comprise determining, by the kernel-space application, connectivity information of the remote endpoint based on the virtual address. These operations can further comprise relaying, by the kernel-space application, network traffic between the user-space application and the remote endpoint, based on the authorizing of the call and using the connectivity information.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 3 illustrates another example system architecture that can facilitate on-demand route determination and delegated authorization in a decentralized service mesh, in accordance with an embodiment of this disclosure;

FIG. 4 illustrates another example system architecture that can facilitate on-demand route determination and delegated authorization in a decentralized service mesh, in accordance with an embodiment of this disclosure;

FIG. 5 illustrates another example system architecture that can facilitate on-demand route determination and delegated authorization in a decentralized service mesh, in accordance with an embodiment of this disclosure;

FIG. 6 illustrates another example system architecture that can facilitate on-demand route determination and delegated authorization in a decentralized service mesh, in accordance with an embodiment of this disclosure;

FIG. 7 illustrates an example process flow that can facilitate on-demand route determination and delegated authorization in a decentralized service mesh, in accordance with an embodiment of this disclosure;

FIG. 8 illustrates another example process flow that can facilitate on-demand route determination and delegated authorization in a decentralized service mesh, in accordance with an embodiment of this disclosure;

FIG. 9 illustrates another example process flow that can facilitate on-demand route determination and delegated authorization in a decentralized service mesh, in accordance with an embodiment of this disclosure;

DETAILED DESCRIPTION

Overview

Figure 1:
FIG. 1 illustrates an example system architecture that can facilitate on-demand route determination and delegated authorization in a decentralized service mesh, in accordance with an embodiment of this disclosure.

There can be scenarios that involve a decentralized service mesh running in a cloud computing environment. That is, control and management plane functions can be distributed across multiple nodes, rather than implemented a centralized control plane. Networking and communication features can be distributed among the participating nodes, enabling autonomy and resilience in the network infrastructure. The same service mesh can be extended using secure communication approaches, which can facilitate routing to globally distributed appliances or applications (which can be referred to as endpoints).

In a complex, distributed network architecture such as this, satisfying security and networking requirements can be a challenge for any service that communicates with one of any globally distributed endpoints. It can be that authorization checks must be in place to ensure that all traffic only reaches the endpoints that the source is explicitly allowed to communicate with. In order to be performant, these checks can be enforced without requiring awareness of all globally distributed endpoints. In some examples, using a fine-grained, restrictive access model can be implemented when operating at this scale.

In such an architecture, the route that traffic can take can be dynamic, depending on multiple factors, such as:

Is the endpoint reachable? For globally distributed endpoints using the internet as a transport medium, it can be that 100% availability is not possible.

Which communication mechanism is available?

Which enabling service of that communication mechanism is available? This can be determined at runtime by the data center with an active always-on connection or a closest server for an on-demand session.

Which instance of that enabling service is available for use? That is, which always-on aggregator and client pair should be used, or which instance and port the on-demand session can be reached on?

Thus, a networking architecture of this type can be described as a large-scale, decentralized service mesh that incorporates some features from a network overlay (for example, dynamic route determination and authorization). Implementing this authorization enforcement and on-demand route determination can pose significant challenges for applications intending to use this networking architecture to communicate with remote endpoints. An example remote endpoint can comprise a management application programming interface (API) for a compute or storage product deployed to a customer network or co-location facility. Another example remote endpoint can comprise a software product deployed to a customer network or public cloud.

Prior approaches lack the benefits of the present techniques. For example, there are prior techniques that facilitate devices to establish a secure, bi-directional communication channel with a platform. There are prior techniques that facilitate secure and private communication between devices and a platform. There are prior techniques that facilitate a secure, lightweight, cloud-native communication mechanism to provide an always-on connection to remote endpoints. There are prior techniques that facilitate a secure communication mechanism to allow an on-demand connection to remote endpoints.

There are prior techniques that facilitate a container orchestration platform on which software-as-a-service (SaaS) related products and offers are provided and maintained. There are prior techniques that facilitate interception and redirection techniques. However, these prior techniques are used to establish the traditional features of a service mesh, such as traffic management, load balancing, service discovery, and observability.

In contrast, the present techniques differ from these prior approaches to authentication and authorization in service meshes. In some examples, the present techniques can be implemented in a service mesh that houses control place mechanisms and business logic within a central hub (running across multiple data centers). This service mesh can reside within a private network(s), and inter-service communication within this service mesh can be handled.

However, a network architecture according to the present techniques can differ from prior approaches in how business logic applications communicate with globally distributed devices (e.g., storage, servers, or software-based devices). According to the present techniques this communication can be facilitated by a secure connectivity mechanism that establishes an encrypted and secure tunnel from the central hub's private network to each remote device.

In contrast to prior approaches, the present techniques can be implemented to move from a standard service mesh to large-scale, decentralized service mesh through extending the mesh with these underlying secure connectivity mechanisms. Applications housed in a private network of the central hub can now transparently reach globally distributed remote devices, each located within its own private network, but reachable via the available secure connectivity mechanism.

Prior approaches lack the dynamic routing, authentication and/or authorization via the available tunneling mechanism of the present techniques. As such, it can be that it is not possible to communicate with the remote devices directly using prior approaches.

The present techniques can be implemented to facilitate using a combination of secure connectivity mechanisms and kernel-level network re-routing to enable on-demand route determination and delegated authorization in a large-scale, decentralized service mesh. This can be effectuated through a transparent and secure connectivity with no code changes required in the requesting application.

The present techniques can be implemented to facilitate decoupling an authorization mechanism from the service mesh and simplifying management (that is, it can be maintained and managed separately to the service mesh), by using a combination of secure connectivity mechanisms and kernel-level network re-routing.

By performing the authorization and route determination within the kernel, the present techniques can facilitate embeds themselves as a native feature of the cloud environment itself, rather than depending on any platforms running within the cloud environment.

Relative to prior approaches, the present techniques can offer various advantages: of performance improvements over a sidecar model due to in-kernel operations; of reduced resource consumption over a sidecar model due to node-level operations; of on-demand route determination (that is, it can be that route and communication mechanism by which traffic will be sent is not a concern of the requesting service); and/or of using existing network interfaces without modification to them; and of avoiding a need for requesting applications to integrate with proprietary application programming interfaces (APIs) when using secure communication mechanisms.

The present techniques can be further distinguished from prior approaches, particularly those that relate to authentication and authorization capabilities that exist within service meshes.

A network architecture according to the present techniques can be different in that the applications deployed within this service mesh can desire to communicate securely with remote endpoints that not directly connected. It can be that these endpoints can only be reached using a secure communication mechanisms that creates an encrypted and secure tunnel from the central hub's private network to each remote device.

Relative to prior approaches, the present techniques can move from a standard to a large-scale decentralized service mesh through extending the mesh with these underlying secure connectivity mechanisms. Applications deployed in the private network of the central hub can now transparently reach globally distributed remote devices each located within its own private network, but reachable via the available secure connectivity mechanism.

Within a node-level interception approach, the present techniques can facilitate dynamic routing, authentication and authorization via an available tunneling mechanism is (where it is not possible to communicate with the remote devices directly).

In some examples, overhead associated with routing according to the present techniques can be mitigated by implementing it at a kernel level.

It can be that, in some examples, the secure connectivity mechanisms according to the present techniques do not have multiple routes to a remote location. Rather, there can be a single, dynamic route to a remote endpoint. It can be that this route can change depending on how connections are distributed globally, and which instances of connectivity platforms are available at the time of connection.

As such, in some examples, it can be that the present techniques can be implemented without considering an optimal route. Routing can be left to the underlying connectivity solutions themselves. Rather, the present techniques can provide a way for the currently active route to be made known to the kernel-level process through the synchronization process running in the user space. The relevant data for the transparent proxy can be kept up to date from the remote management endpoint data.

The present techniques can be implemented to leverage a transparent proxy, with seamless kernel-level network re-routing. The present techniques can be distinguished from prior approaches to pure transparent proxies because transparent proxies generally operate at the application layer, while the present techniques can operate at the kernel layer. This can mean higher performance and better integration.

It can be that applications utilizing transparent proxies need to be proxy-aware (e.g., a protocol to specify the proxy server and credentials in respective application requests). In contrast, seamless interception and network re-routing according to the present techniques can remove a need for applications to be proxy-aware. They can initiate requests like they were directly connected to the remote endpoint.

Example Architectures

FIG. 1 illustrates an example system architecture 100 that can facilitate on-demand route determination and delegated authorization in a decentralized service mesh, in accordance with an embodiment of this disclosure.

System architecture 100 comprises server 102, communications network 104, remote computer 106, and remote endpoint 110. In turn, server 102 comprises on-demand route determination and delegated authorization in a decentralized service mesh component 108 (kernel space), service mesh 112, containerized applications 114, containerized application 116 (which comprises microservice 118 (user space)), remote connectivity A 124A, and remote connectivity B 124B.

Figure 10:
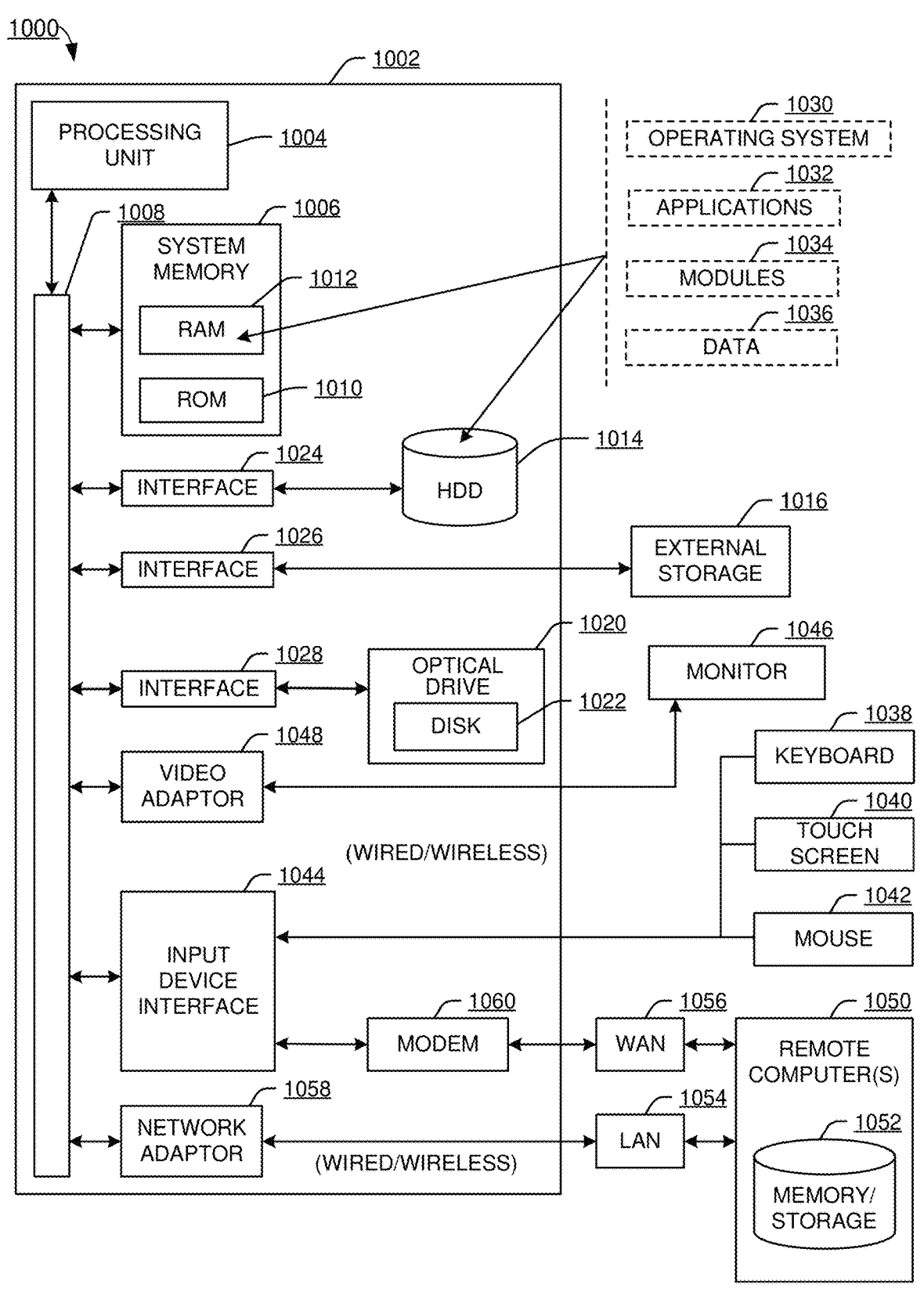
FIG. 10 illustrates an example block diagram of a computer operable to execute an embodiment of this disclosure.

Each of server 102, remote computer 106, and/or remote endpoint 110 can be implemented with part(s) of computing environment 1000 of FIG. 10. Communications network 104 can comprise a computer communications network, such as the Internet.

Server 102 can host a computer service that is implemented with a microservice architecture, and which can be accessed and/or invoked by remote computer 106 via communications network 104. A microservice of containerized applications 114 and/or microservice 118 can access remote endpoint 110 as part of implementing the computer service, and this access can include performing authentication and/or identity management services.

Service mesh 112 can generally comprise an infrastructure layer for inter-microservice communications between microservices of containerized applications 114 and containerized application 116 (e.g., microservice 118). Microservice 118 can generally comprise computer-executable code that is configured to perform a specific task, as well as to interact with other microservices (as part of implementing a computer service) via a protocol.

Containerized application 116 generally comprises a group of containers that have shared storage and network resources, where each of microservice 118 and sidecar 122 execute within separate containers within containerized application 116. In some examples, containerized application 116 can comprise a dedicated session of resources. In some examples, containerized applications 114 comprises multiple instances of a containerized application, which can each be similar to containerized application 116.

Microservice 118 (user space) can execute in a user space of server 102, and on-demand route determination and delegated authorization in a decentralized service mesh component 108 (kernel space) can execute in a kernel space of server 102. A memory space of server 102 can generally be divided into a user space and a kernel space. A user space can generally comprise a memory area in which user applications operate. A kernel space can generally comprise a memory area in which the operating system kernel for server 102 operates.

On-demand route determination and delegated authorization in a decentralized service mesh component 108 can intercept a call from microservice 118 that is directed to remote endpoint 110. On-demand route determination and delegated authorization in a decentralized service mesh component 108 can perform authorization and routing functions for this call.

Remote connectivity 124A and remote connectivity 124B can each comprise a secure connectivity mechanism that can be used by microservice 118 to access remote endpoint 110. In some examples, remote connectivity 124A and remote connectivity 124B implement different remote connectivity protocols, have different network routing to microservice 118 within service mesh 112, and it can be that they are not always active (so that an on-demand routing to an available connectivity mechanism can be made at the time of a request by microservice 118 to access remote endpoint 110).

In some examples, on-demand route determination and delegated authorization in a decentralized service mesh component 108 can implement part(s) of the process flows of FIGS. 7-9 to implement on-demand route determination and delegated authorization in a decentralized service mesh.

It can be appreciated that system architecture 100 is one example system architecture for on-demand route determination and delegated authorization in a decentralized service mesh, and that there can be other system architectures that facilitate on-demand route determination and delegated authorization in a decentralized service mesh.

Figure 2:
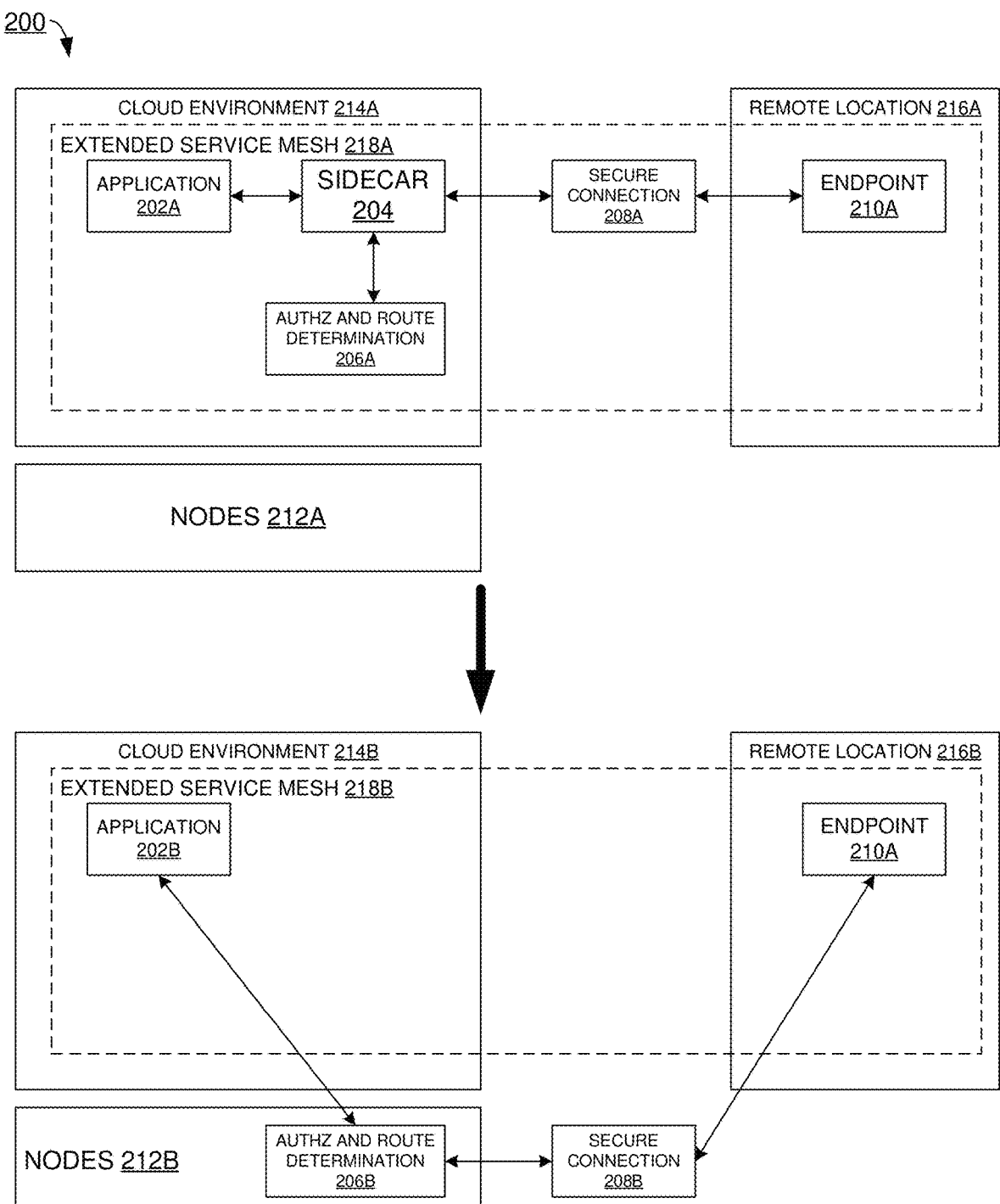
FIG. 2 illustrates another example system architecture that can facilitate on-demand route determination and delegated authorization in a decentralized service mesh, in accordance with an embodiment of this disclosure.

FIG. 2 illustrates another example system architecture 200 that can facilitate on-demand route determination and delegated authorization in a decentralized service mesh, in accordance with an embodiment of this disclosure. In some examples, part(s) of system architecture 200 can be implemented by part(s) of system architecture 100 of FIG. 1 to facilitate on-demand route determination and delegated authorization in a decentralized service mesh.

System architecture 200 comprises application 202A, sidecar 204, authorization (authZ) and route determination 206A, secure connection 208A, endpoint 210A, nodes 212A, cloud environment 214A, remote location 216A, and extended service mesh 218A. This can represent an architecture that facilitates authorization and route determination with a sidecar model.

System architecture 200 also comprises application 202B, sidecar 204, authZ and route determination 206B, secure connection 208B, endpoint 210B, nodes 212B, cloud environment 214B, remote location 216B, and extended service mesh 218B. This can represent an architecture that facilitates authorization and route determination with a kernel application.

The present techniques can be implemented to facilitate authorization and route determination with a sidecar model. The present techniques can be further implemented to facilitate a node-level model that can increase scalability, consistency, simplified management, and offer performance gains relative to a sidecar model, and to prior approaches.

FIG. 3 illustrates another example system architecture 300 that can facilitate on-demand route determination and delegated authorization in a decentralized service mesh, in accordance with an embodiment of this disclosure. In some examples, part(s) of system architecture 300 can be implemented by part(s) of system architecture 100 of FIG. 1 to facilitate on-demand route determination and delegated authorization in a decentralized service mesh.

System architecture 300 comprises application 302, secure connection 308, endpoint 310, nodes 312, cloud environment 314, and remote location 316.

Consider an example of a decentralized service mesh running in a cloud computing environment hosting a high-performance application. Networking and communication features can be distributed across multiple nodes rather than a centralized control plane. This same service mesh can be extended using secure communication methodologies enabling routing to globally distributed appliances or applications (endpoints).

In a complex, distributed network architecture such as this, satisfying the security and networking requirements can pose problems for an application that communicates with one of the globally distributed endpoints. This communication can be satisfied in a way that is optimized for performance (or for which performance is satisfactory).

Security aspects can include authorization checks to ensure that only authorized applications can communicate with remote endpoints over the secure connections. These authorization checks can be enforced without requiring awareness of all globally distributed remote endpoints. In some examples, this can be implemented via a fine-grained, restrictive access model.

Network aspects can involve dynamically routing traffic to the endpoint, depending on:

Is the endpoint reachable?

Which secure connectivity mechanism is available?

Where is the egress point from the cloud environment?

What is/are the identifier(s) used to route the traffic as required?

With these features, this decentralized service mesh can exhibit some traits of a network overlay, e.g., dynamic route determination and authorization. This can pose problems for high performance applications intending to communicate with remote endpoints.

FIG. 4 illustrates another example system architecture 400 that can facilitate on-demand route determination and delegated authorization in a decentralized service mesh, in accordance with an embodiment of this disclosure. In some examples, part(s) of system architecture 400 can be implemented by part(s) of system architecture 100 of FIG. 1 to facilitate on-demand route determination and delegated authorization in a decentralized service mesh.

System architecture 400 comprises application 402, authZ and route determination 406, secure connection 408, endpoint 410, nodes 412, cloud environment 414, remote location 416, and effective communication 418.

Where a program is added to the nodes that support the cloud environment to intercept outbound calls to remote endpoints, the responsibility for authorization and route determination can be transparently delegated to that process. This can separate an authorization decision from enforcement and allows it to take place outside of the service mesh. Route determination can also be performed on demand based on a currently available route to the remote endpoint.

To make this transparent to the cloud environment, this process can be executed in the kernel of each node. This can be achieved by extending the code running in the kernel with an interception program for these purposes. This program can respond to network events such as traffic control, thus enabling in the interception of outbound calls to remote endpoints. Once intercepted, the program can:

enforce the required authorization checks based on the source of the request;

determine the appropriate route to the requested endpoint; and relay traffic to that endpoint via the available secure connectivity mechanism.

FIG. 5 illustrates another example system architecture 500 that can facilitate on-demand route determination and delegated authorization in a decentralized service mesh, in accordance with an embodiment of this disclosure. In some examples, part(s) of system architecture 500 can be implemented by part(s) of system architecture 100 of FIG. 1 to facilitate on-demand route determination and delegated authorization in a decentralized service mesh.

System architecture 500 comprises application 502, authZ and route determination 506, secure connection 508, endpoint 510, nodes 512, cloud environment 514, remote location 516, extended service mesh 518, remote endpoint management 520, and effective communication 522.

When an application running in the cloud environment makes an outbound call, it can do so using a virtual address of the endpoint(s) it is reaching. These virtual addresses can be available to both the application in the cloud environment and instances of an interception program running on nodes supporting the cloud environment. Once the application makes the outbound call, the interception program can intercept this call by recognizing the virtual address, then perform an authorization check and route determination, before relaying the call to the remote endpoint via the secure communication mechanism.

The actions performed by the interception process can be transparent to the application running on the cloud. To this application, it can appear as if it is talking directly to the remote endpoint.

FIG. 6 illustrates another example system architecture 600 that can facilitate on-demand route determination and delegated authorization in a decentralized service mesh, in accordance with an embodiment of this disclosure. In some examples, part(s) of system architecture 600 can be implemented by part(s) of system architecture 100 of FIG. 1 to facilitate on-demand route determination and delegated authorization in a decentralized service mesh.

System architecture 600 comprises authZ and route determination 606A, authZ and route sync 606B-1, authZ and routing 606B-2, nodes 612A, nodes 612B, remote endpoint management 620, shared data 622, user space 624, and kernel space 626.

For a call, authZ and routing 606B-2 can perform an allow/deny check would simply be performed using the following inputs:

The source of the request, e.g., the microservice application. This data point can be available to authZ and routing 606B-2 by examining the source of the intercepted network call.

The virtual address used in the outbound call. This data point can be available to authZ and routing 606B-2 by examining the destination of the intercepted network call.

Once authZ and routing 606B-2 has these two data points, an authorization check can be performed based on the authorization rules available to that node. These rules can be synchronized across all nodes through a companion application running in the user space (e.g., authZ and routing sync 606B-1. This companion application can be responsible for ensuring any changes to these authorization rules are reflected in the shared data (which can be available to the user and kernel space applications via shared data 622).

In some examples, programs running in a node's kernel cannot communicate directly with applications running outside of its node. Operations like this can be allowed to run in the user space. However, it can be possible for programs running in the user space to share data with programs running in the kernel space through system calls.

As such, a companion application can be deployed to the user space to make the authorization and routing data available to the program running in the kernel. This companion application can run across nodes supporting the cloud environment and ensure that the data made available to the kernel program is up to date.

Example Process Flows

FIG. 7 illustrates an example process flow 700 that can facilitate on-demand route determination and delegated authorization in a decentralized service mesh, in accordance with an embodiment of this disclosure. In some examples, one or more embodiments of process flow 700 can be implemented by on-demand route determination and delegated authorization in a decentralized service mesh component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 800 of FIG. 8, and/or process flow 900 of FIG. 9.

Process flow 700 begins with 702, and moves to operation 704.

Operation 704 depicts executing a containerized application that comprises a microservice of a group of microservices maintained by a decentralized service mesh architecture, wherein the group of microservices executes on nodes. Using the example of FIG. 1, the containerized application can be containerized application 116, the microservice can be microservice 118, and the decentralized service mesh architecture can include service mesh 112.

After operation 704, process flow 700 moves to operation 706.

Operation 706 depicts intercepting, by a kernel-space application of a node of the nodes, a call from the microservice that is directed to a remote endpoint that is external to the decentralized service mesh architecture, wherein the kernel-space application operates in a kernel space of the node, and wherein the microservice executes in a user space of the node. Continuing with the example of FIG. 1, the kernel-space application can be on-demand route determination and delegated authorization in a decentralized service mesh component 108 (where it executes in a kernel space of server 102), server 102 can comprise the node, and the remote endpoint can be remote endpoint 110.

In some examples, the intercepting occurs based on identifying the virtual address of the remote endpoint in the call. That is, calls can be intercepted because they are directed to a remote endpoint (where it can be that calls that are not directed to a remote endpoint are not intercepted).

In some examples, the call is a first call, the intercepting is a first intercepting, the virtual address is a first virtual address, the remote endpoint is a first remote endpoint, and the operations further comprise refraining from performing a second intercepting of a second call based on the second call omitting an identification of a second virtual address of a second remote endpoint, wherein the second virtual address comprises the first virtual address or another virtual address other than the first virtual address, and wherein the second remote endpoint comprises the first remote endpoint or another remote endpoint other than the first remote endpoint. That is, where a call is not directed to a remote endpoint (e.g., it is directed to another microservice executing on the nodes), then it can be that that call is not intercepted.

In some examples, the kernel-space application is configured to access identifications of virtual addresses for remote endpoints that are in use by the system. That is, kernel-space application can have access to which virtual addresses identify remote endpoints, so can use that information to determine which calls to intercept.

In some examples, operation 706 comprises sharing, by a user-space application that executes in the user space of the node and with the kernel-space application, authorization data and routing data via a system call, wherein the authorization data is representative of an authorization to relay the network traffic, wherein the routing data is representative of at least one route via which the network traffic is able to be relayed, and wherein the kernel-space application uses the authorization data and uses the routing data in performing the relaying of the network traffic. Using the example of FIG. 6, the user-space application can be authZ and route sync 606B-1 and the kernel-space application can be authZ and routing 606B-2.

In some examples, the kernel space of the node comprises a memory address space of the node in which an operating system kernel of the node operates. That is, the kernel space can be similar to kernel space 626 of FIG. 6.

In some examples, the user space of the node comprises a memory address space of the node in which user applications of the node operate. That is, the user space can be similar to user space 624 of FIG. 6.

After operation 706, process flow 700 moves to operation 708.

Operation 708 depicts performing, by the kernel-space application, an authorization check on the call based on an identification of the microservice and a virtual address of the remote endpoint identified in the call, to produce an authorization result. That is, on-demand route determination and delegated authorization in a decentralized service mesh component 108 of FIG. 1 can perform authorization checks for microservices that attempt to access remote endpoints.

After operation 708, process flow 700 moves to operation 710.

Operation 710 depicts determining, by the kernel-space application, connectivity information of the remote endpoint based on the virtual address of the remote endpoint identified in the call.

This connectivity information can include selection of one of remote connectivity A 124A and remote connectivity B 124B (each of which can be a secure connectivity mechanism).

In some examples, the network route to the remote endpoint comprises a connectivity mechanism that satisfies a security criterion. This connectivity mechanism can be similar to remote connectivity A 124A and/or remote connectivity B 124B of FIG. 1.

After operation 710, process flow 700 moves to operation 712.

Operation 712 depicts relaying, by the kernel-space application, network traffic between the microservice and the remote endpoint, based on the authorization result indicating that the call is authorized and using the connectivity information. That is, continuing with the example of FIG. 1, on-demand route determination and delegated authorization in a decentralized service mesh component 108 can relay communications between microservice 118 and remote endpoint 110.

After operation 712, process flow 700 moves to 714, where process flow 700 ends.

FIG. 8 illustrates another example process flow 800 that can facilitate on-demand route determination and delegated authorization in a decentralized service mesh, in accordance with an embodiment of this disclosure. In some examples, one or more embodiments of process flow 800 can be implemented by on-demand route determination and delegated authorization in a decentralized service mesh component 108 of FIG. 1, or computing environment 1000 of FIG. 10.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, and/or process flow 900 of FIG. 9.

Process flow 800 begins with 802, and moves to operation 804.

Operation 804 depicts intercepting, by a kernel-space application of a system comprising at least one processor, a call from a microservice that is directed to a remote endpoint that is external to a decentralized service mesh architecture that comprises the microservice. In some examples, operation 804 can be implemented in a similar manner as operations 704-706 of FIG. 7.

Inn some examples, control and management plane functions of the decentralized service mesh architecture are distributed across a group of nodes that comprises a node via which the kernel-space application executes.

In some examples, the kernel-space application responds to network events associated with the microservice. These network events can be traffic control events, e.g. events created by a network ingress to the node or egress from the node. In some examples, the kernel-space application responds to egress events and not ingress events.

After operation 804, process flow 800 moves to operation 806.

Operation 806 depicts performing, by the kernel-space application, an authorization check on the call based on an identification of the microservice and a virtual address of the remote endpoint identified in the call, to produce an authorization result. In some examples, operation 806 can be implemented in a similar manner as operation 708 of FIG. 7.

In some examples, a group of nodes that comprises a node via which the kernel-space application executes, and wherein respective nodes of the group of nodes comprise respective instances of the kernel-space application. That is, where the node is part of a cluster of nodes, it can be that each node in the cluster can execute an instance of the kernel-space application.

After operation 806, process flow 800 moves to operation 808.

Operation 808 depicts determining, by the kernel-space application, connectivity information of the remote endpoint based on the virtual address. In some examples, operation 808 can be implemented in a similar manner as operation 710 of FIG. 7.

In some examples, authorization of the microservice and determining the connectivity information of the remote endpoint are performed based on the call. That is, route determination and authentication can be performed dynamically.

After operation 808, process flow 800 moves to operation 810.

Operation 810 depicts relaying, by the kernel-space application, network traffic between the microservice and the remote endpoint, based on the authorization result indicating that the call is authorized and using the connectivity information. In some examples, operation 810 can be implemented in a similar manner as operation 712 of FIG. 7.

In some examples, the relaying of the network traffic between the microservice and the remote endpoint comprises extending the decentralized service mesh architecture to comprise the remote endpoint. This can be similar to extended service mesh 518 of FIG. 5.

After operation 810, process flow 800 moves to 812, where process flow 800 ends.

FIG. 9 illustrates another example process flow 900 that can facilitate on-demand route determination and delegated authorization in a decentralized service mesh, in accordance with an embodiment of this disclosure. In some examples, one or more embodiments of process flow 900 can be implemented by on-demand route determination and delegated authorization in a decentralized service mesh component 108 of FIG. 1, or computing environment 1000 of FIG. 10.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, and/or process flow 800 of FIG. 8.

Process flow 900 begins with 902, and moves to operation 904.

Operation 904 depicts intercepting, by a kernel-space application, a call from a user-space application that is directed to a remote endpoint. In some examples, operation 904 can be implemented in a similar manner as operations 704-706 of FIG. 7.

In some examples, the microservice omits a capability to directly communicate with the remote endpoint. That is, it can be that the microservice cannot communicate with the remote endpoint absent intervention by the kernel-space application.

In some examples, the intercepting occurs based on identifying the virtual address of the remote endpoint in the call. In some examples, identifications of virtual addresses for remote endpoints that are in use by the system are accessible by the kernel-space application.

In some examples, the user-space application is a first user-space application, and operation 904 comprises sharing, by a second user-space application and with the kernel-space application, authorization data and routing data via a system call, wherein the authorization data is representative of an authorization to relay the network traffic, wherein the routing data is representative of at least one route via which the network traffic is able to be relayed, and wherein the kernel-space application uses the authorization data and uses the routing data in performing the relaying of the network traffic.

After operation 904, process flow 900 moves to operation 906.

Operation 906 depicts authorizing, by the kernel-space application, the call based on an identification of the user-space application and a virtual address of the remote endpoint identified in the call, to produce an authorization result. In some examples, operation 906 can be implemented in a similar manner as operation 708 of FIG. 7.

After operation 906, process flow 900 moves to operation 908.

Operation 908 depicts determining, by the kernel-space application, connectivity information of the remote endpoint based on the virtual address. In some examples, operation 908 can be implemented in a similar manner as operation 710 of FIG. 7.

After operation 908, process flow 900 moves to operation 910.

Operation 910 depicts relaying, by the kernel-space application, network traffic between the user-space application and the remote endpoint, based on the authorizing of the call and using the connectivity information. In some examples, operation 910 can be implemented in a similar manner as operation 712 of FIG. 7.

In some examples, the user-space application is a first user-space application, the network traffic is first network traffic, the remote endpoint is a first remote endpoint, and operation 910 comprises intercepting and relaying, by the kernel-space application, second network traffic between a second user-space application and a second remote endpoint, wherein the second user-space application comprises the first user-space application or another user-space application, and wherein the second remote endpoint comprises the first remote endpoint or another remote endpoint. That is, the present techniques can be implemented with one instance of a kernel-space application per node, and that one instance can handle authentication and routing for each microservice/application that executes on that node.

After operation 910, process flow 900 moves to 912, where process flow 900 ends.

Example Operating Environment

In order to provide additional context for various embodiments described herein, FIG. 10 and the following discussion are intended to provide a brief, general description of a suitable computing environment 1000 in which the various embodiments of the embodiment described herein can be implemented.

For example, parts of computing environment 1000 can be used to implement one or more embodiments of server 102, remote computer 106, and/or remote endpoint 110.

In some examples, computing environment 1000 can implement one or more embodiments of the process flows of FIGS. 7-9 to facilitate on-demand route determination and delegated authorization in a decentralized service mesh.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a nonvolatile storage such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples, and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
at least one processor; and
at least one memory that stores executable instructions that, when executed by the at least one processor, facilitate performance of operations, comprising:
executing a containerized application that comprises a microservice of a group of microservices maintained by a decentralized service mesh architecture, wherein the group of microservices executes on nodes;
intercepting, by a kernel-space application of a node of the nodes, a call from the microservice that is directed to a remote endpoint that is external to the decentralized service mesh architecture, wherein the kernel-space application operates in a kernel space of the node, and wherein the microservice executes in a user space of the node;
performing, by the kernel-space application, an authorization check on the call based on an identification of the microservice and a virtual address of the remote endpoint identified in the call, to produce an authorization result;
determining, by the kernel-space application, connectivity information of the remote endpoint based on the virtual address of the remote endpoint identified in the call; and
relaying, by the kernel-space application, network traffic between the microservice and the remote endpoint, based on the authorization result indicating that the call is authorized and using the connectivity information.

2. The system of claim 1, wherein the intercepting occurs based on identifying the virtual address of the remote endpoint in the call.

3. The system of claim 2, wherein the call is a first call, wherein the intercepting is a first intercepting, wherein the virtual address is a first virtual address, wherein the remote endpoint is a first remote endpoint, and wherein the operations further comprise:
refraining from performing a second intercepting of a second call based on the second call omitting an identification of a second virtual address of a second remote endpoint, wherein the second virtual address comprises the first virtual address or another virtual address other than the first virtual address, and wherein the second remote endpoint comprises the first remote endpoint or another remote endpoint other than the first remote endpoint.

4. The system of claim 2, wherein the kernel-space application is configured to access identifications of virtual addresses for remote endpoints that are in use by the system.

5. The system of claim 1, wherein the operations further comprise:

sharing, by a user-space application that executes in the user space of the node and with the kernel-space application, authorization data and routing data via a system call, wherein the authorization data is representative of an authorization to relay the network traffic, wherein the routing data is representative of at least one route via which the network traffic is able to be relayed, and wherein the kernel-space application uses the authorization data and uses the routing data in performing the relaying of the network traffic.

6. The system of claim 1, wherein the kernel space of the node comprises a memory address space of the node in which an operating system kernel of the node operates.

7. The system of claim 1, wherein the user space of the node comprises a memory address space of the node in which user applications of the node operate.

8. A method, comprising:

intercepting, by a kernel-space application of a system comprising at least one processor, a call from a microservice that is directed to a remote endpoint that is external to a decentralized service mesh architecture that comprises the microservice;

performing, by the kernel-space application, an authorization check on the call based on an identification of the microservice and a virtual address of the remote endpoint identified in the call, to produce an authorization result;

determining, by the kernel-space application, connectivity information of the remote endpoint based on the virtual address; and relaying, by the kernel-space application, network traffic between the microservice and the remote endpoint, based on the authorization result indicating that the call is authorized and using the connectivity information.

9. The method of claim 8, wherein the relaying of the network traffic between the microservice and the remote endpoint comprises extending the decentralized service mesh architecture to comprise the remote endpoint.

10. The method of claim 8, wherein control and management plane functions of the decentralized service mesh architecture are distributed across a group of nodes that comprises a node via which the kernel-space application executes.

11. The method of claim 8, wherein the network route to the remote endpoint comprises a connectivity mechanism that satisfies a security criterion.

12. The method of claim 8, wherein a group of nodes that comprises a node via which the kernel-space application executes, and wherein respective nodes of the group of nodes comprise respective instances of the kernel-space application.

13. The method of claim 8, wherein the kernel-space application responds to network events associated with the microservice.

14. The method of claim 8, wherein authorization of the microservice and determining the connectivity information of the remote endpoint are performed based on the call.

15. A non-transitory computer-readable medium comprising instructions that, in response to execution, cause a system comprising at least one processor to perform operations, comprising:

intercepting, by a kernel-space application, a call from a user-space application that is directed to a remote endpoint;

authorizing, by the kernel-space application, the call based on an identification of the user-space application and a virtual address of the remote endpoint identified in the call, to produce an authorization result;

determining, by the kernel-space application, connectivity information of the remote endpoint based on the virtual address; and relaying, by the kernel-space application, network traffic between the user-space application and the remote endpoint, based on the authorizing of the call and using the connectivity information.

16. The non-transitory computer-readable medium of claim 15, wherein the user-space application is a first user-space application, wherein the network traffic is first network traffic, wherein the remote endpoint is a first remote endpoint, and wherein the operations further comprise:

intercepting and relaying, by the kernel-space application, second network traffic between a second user-space application and a second remote endpoint, wherein the second user-space application comprises the first user-space application or another user-space application, and wherein the second remote endpoint comprises the first remote endpoint or another remote endpoint.

17. The non-transitory computer-readable medium of claim 15, wherein the microservice omits a capability to directly communicate with the remote endpoint.

18. The non-transitory computer-readable medium of claim 15, wherein the intercepting occurs based on identifying the virtual address of the remote endpoint in the call.

19. The non-transitory computer-readable medium of claim 18, wherein identifications of virtual addresses for remote endpoints that are in use by the system are accessible by the kernel-space application.

20. The non-transitory computer-readable medium of claim 15, wherein the user-space application is a first user-space application, and wherein the operations further comprise:

sharing, by a second user-space application and with the kernel-space application, authorization data and routing data via a system call, wherein the authorization data is representative of an authorization to relay the network traffic, wherein the routing data is representative of at least one route via which the network traffic is able to be relayed, and wherein the kernel-space application uses the authorization data and uses the routing data in performing the relaying of the network traffic.

* * * * *